(12) United States Patent
Lee

(10) Patent No.: US 7,168,763 B2
(45) Date of Patent: Jan. 30, 2007

(54) SEATBACK RECLINING APPARATUS FOR A VEHICLE

(75) Inventor: Sang Sul Lee, Gwangmyeong-si (KR)

(73) Assignee: Kia Motors Corporation, Seoul (KR)

( * ) Notice: Subject to any disclaimer, the term of this patent is extended or adjusted under 35 U.S.C. 154(b) by 49 days.

(21) Appl. No.: 11/023,698

(22) Filed: Dec. 27, 2004

(65) Prior Publication Data

US 2006/0033372 A1    Feb. 16, 2006

(30) Foreign Application Priority Data

Aug. 12, 2004    (KR)    ...................... 10-2004-0063479

(51) Int. Cl.
*B60N 2/02*    (2006.01)
(52) U.S. Cl. ...................... 297/364; 297/365; 297/363; 297/232; 297/238; 297/354.1
(58) Field of Classification Search ............ 297/361.1, 297/354.12, 354.13, 354.1, 257, 232, 115, 297/113, 230.14, 363, 365, 364, 411.32, 411.3; 267/156, 157
See application file for complete search history.

(56) References Cited

U.S. PATENT DOCUMENTS

| 4,384,743 | A | * | 5/1983 | Barley | ................... | 297/354.12 |
|---|---|---|---|---|---|---|
| 4,384,744 | A | * | 5/1983 | Barley | ................... | 297/367 |
| 4,830,433 | A | * | 5/1989 | Takahashi | ............... | 297/354.12 |
| 4,889,386 | A | * | 12/1989 | Kochy et al. | ................ | 297/359 |
| 4,902,072 | A | * | 2/1990 | Chancellor, Jr. | ....... | 297/411.32 |
| 4,969,686 | A | * | 11/1990 | Germain | ................. | 297/411.32 |
| 5,156,438 | A | * | 10/1992 | Hayakawa et al. | ......... | 297/335 |
| 5,433,507 | A | * | 7/1995 | Chang | ................... | 297/367 |
| 5,511,853 | A | * | 4/1996 | Wallis | ................. | 297/364 |
| 5,749,624 | A | * | 5/1998 | Yoshida | ...................... | 297/367 |
| 5,810,290 | A | * | 9/1998 | Merensky et al. | ....... | 244/118.6 |
| 6,024,410 | A | * | 2/2000 | Yoshida | ................... | 297/301.1 |
| 6,056,280 | A | * | 5/2000 | Dials et al. | ................. | 267/155 |
| 6,217,119 | B1 | * | 4/2001 | Cook et al. | ............ | 297/411.32 |
| 6,789,849 | B2 | * | 9/2004 | Gray | ..................... | 297/378.12 |

* cited by examiner

*Primary Examiner*—Peter M. Cuomo
*Assistant Examiner*—Erika Garrett
(74) *Attorney, Agent, or Firm*—Morgan Lewis & Bockius LLP

(57) ABSTRACT

A seatback reclining apparatus capable of independently reclining divided seatbacks with different angles. Thereby, interference with a trim of a wheel housing when the seatback is positioned to a flat position is prevented. The seatback includes a reclining shaft provided with a first winding part and a second winding part that is apart from the first winding part with a predetermined distance. The diameter of the first winding part is bigger than that of the second winding part. Around the first winding part, a first spiral spring is provided. The second winding part is provided with a second spiral spring whose number of winds is greater than that of the first spiral spring.

5 Claims, 4 Drawing Sheets

SEATBACK RECLINING APPARATUS FOR A VEHICLE

CROSS REFERENCE TO RELATED APPLICATION

This application is based on, and claims priority to, Korean Patent Application No. 2004-0063479, filed on Aug. 12, 2004, the disclosure of which is hereby incorporated by reference.

TECHNICAL FIELD OF THE INVENTION

The present invention generally relates to a seatback reclining apparatus for a vehicle. More particularly, the seatback reclining apparatus is capable of independently reclining divided seatbacks with different angles such that interference with a trim of a wheel housing is prevented.

BACKGROUND OF THE INVENTION

Typically, vans, RVs (Recreational Vehicles), and SUVs (Sport Utility Vehicles) are provided with at least two rows of seats. The second row of the seats is typically furnished with a fold-flat feature that allows the seatback thereof to be folded backward to a flat position substantially parallel to a seat cushion.

However, in such a conventional seat, both sides of the second row seatback come into an interference with a trim of a wheel housing as the seatback is folded into a flat position. This is because the trim of the wheel housing protrudes into the interior of the vehicle. For prevention such interference, some seats employ divided seatbacks consisting of a main seatback and a subsidiary seatback. In these designs, the subsidiary seatback is positioned at one side of the main seatback, where the interference with the wheel housing occurs, and fits into the main seatback. When the seatback is folded into a flat position, the subsidiary seatback is removed from the main seatback so as to prevent interference with the trim of the wheel housing. However, in such seats, it is troublesome to remove or attach the subsidiary seatback from or to the main seatback whenever the fold-flat feature is desired.

In another conventional seat, divided seatbacks consisting of a main seatback and a subsidiary seatback are provided. The subsidiary seatback is hinged to the main seatback. In an upright position, the subsidiary seatback is positioned in a line with the maim seatback. With such an arrangement, the subsidiary seatback is folded toward a center of the main seatback, so that the interference with the trim of the wheel housing is prevented. However, this seatback is disadvantageous in that the folded subsidiary seatback constrains movement of a passenger, thereby, making the passenger feel uncomfortable.

SUMMARY OF THE INVENTION

It is an object of the present invention to provide a seatback reclining apparatus capable of independently reclining divided seatbacks with different angles for preventing interference with a trim of a wheel housing in a flat position of the seatbacks. To achieve this object, one embodiment of a seatback reclining apparatus having a reclining means includes seatbacks divided into a main seatback and a subsidiary seatback. The subsidiary seatback has a width substantially the same as the width of a trim of a wheel housing protruded into the interior of a vehicle. The seatback reclining apparatus includes a reclining shaft, to which the main seatback and the subsidiary seatback is rotatably coupled at the lower end thereof. The reclining shaft comprises a first winding part and a second winding part, the second winding part being separate from the first winding part by a predetermined distance. The diameter of the first winding part is bigger than that of the second winding part. Around the first winding part, a first spiral spring is provided. The second winding part is provided with a second spiral spring whose number of winds is greater than that of the first spiral spring.

Preferably, the first winding part and the second winding part are substantially located below each side of the subsidiary seatback and the main seatback, respectively. Preferably, the ends of the first spiral spring and the second spiral spring are respectively coupled to fixing pins disposed on frames of the subsidiary seatback and the main seatback.

BRIEF DESCRIPTION OF THE DRAWINGS

The aforementioned aspect and other features of the present invention will be explained in the following detailed description, taken in conjunction with the accompanying drawings, wherein.

DETAILED DESCRIPTION OF PREFERRED EMBODIMENTS

Figure 2:
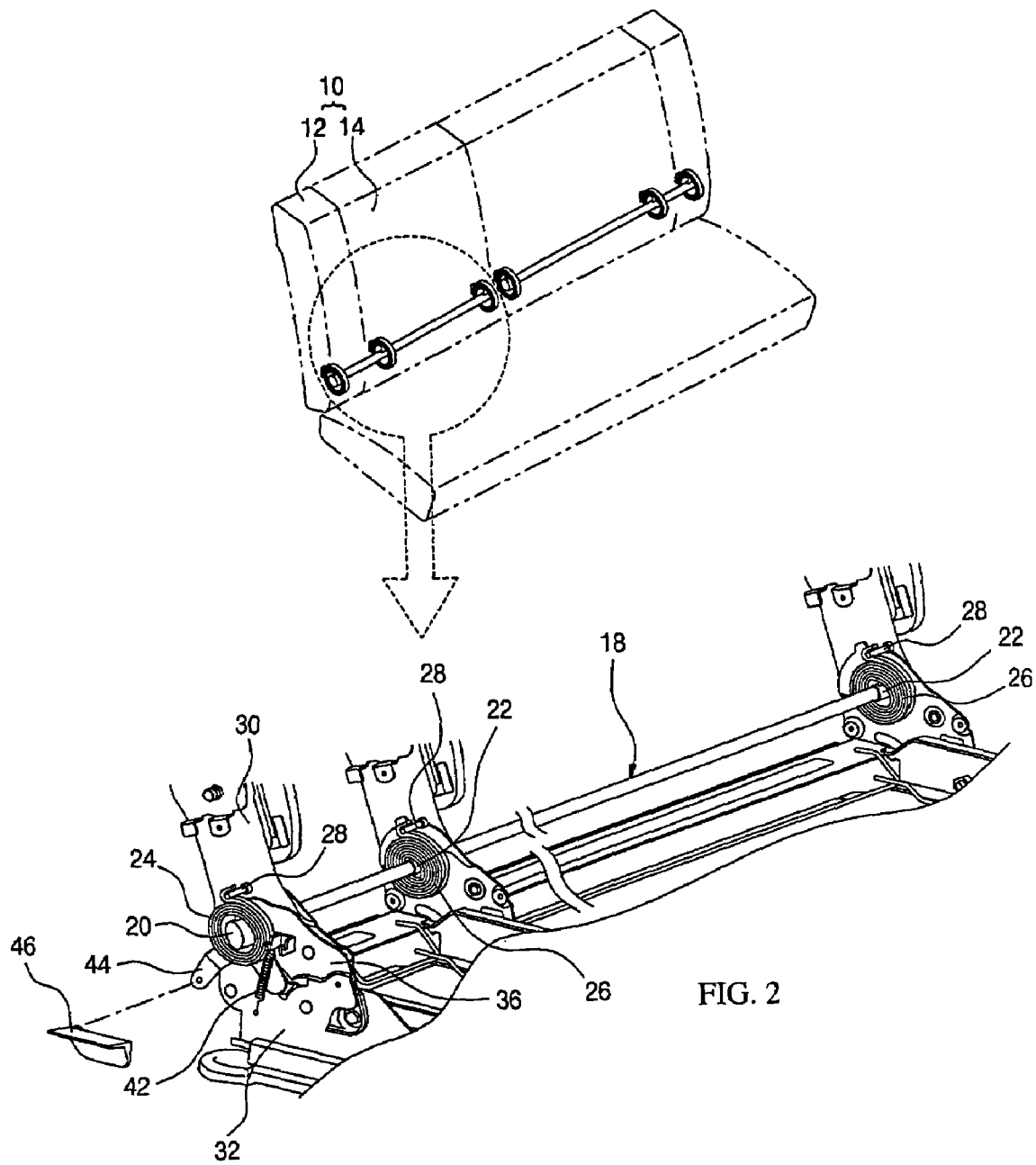
FIG. 2 is a perspective view of a seatback reclining apparatus according to an embodiment of the present invention.

Referring to FIG. 2, both ends of seatback frame are coupled to a base plate 30 that is pivotally connected to a connecting frame 32 fixed to the floor of a vehicle. The connecting frame 32 is provided with a reclining shaft 18 on which a reclining bracket 36 is rotatably mounted. A restoring spring 42, resiliently connecting the front end of the reclining bracket 36 to the connecting frame 32, is provided in order to restore the reclining bracket 36 into an initial position after operating the reclining bracket 36. Extended from the rear end of the reclining bracket 36 is a reclining lever 44 which is adapted to receive a handle 46 thereto. The reclining shaft 18 passes through the reclining bracket 36, the base plate 30, and the connecting frame 32.

Figure 1:
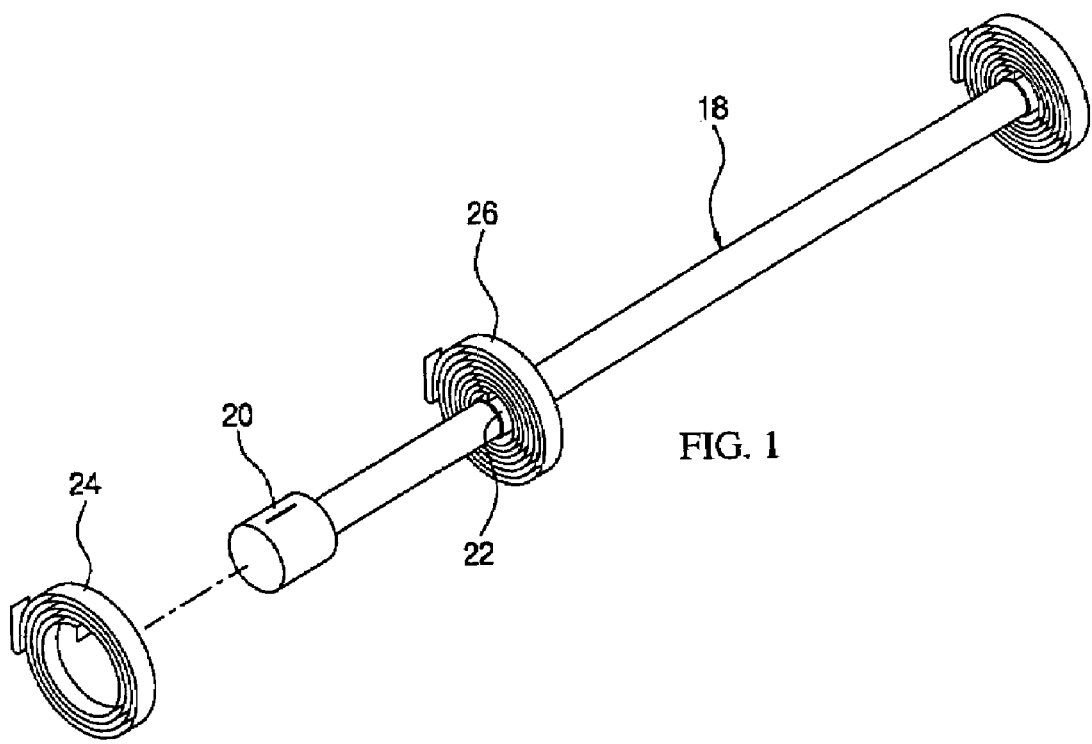
FIG. 1 is an exploded perspective view of a reclining shaft of a seatback reclining apparatus according to an embodiment of the present invention.

Referring now to FIG. 1, at one end of the reclining shaft 18, a spiral spring 24 is provided, in which the inner end of the spiral spring 24 is fit into a slit formed on the reclining shaft 18. The outer end of the spiral spring 24 is secured to a fixing pin 28 formed on the base plate 30. The spiral spring 24 is biased to unwind position. With such an arrangement, when the handle 46 is pulled upward, locking of the seatback frame is released in a conventional manner leading to a free movement of the seatback frame. Because the locking mechanism is well known in the art, such a mechanism is not specifically disclosed herein.

When the locking of the seatback frame is released in case where no passenger sits thereon, the spiral spring 24 exert rotating force on the seatback frame relative to the connecting frame 32 via the fixing pin 26 while unwinding. Therefore, the seatback frame is tilted forward. When the locking of the seatback frame is released and the external force is applied to the seatback, the seatback frame is folded into a flat position substantially parallel to a seat cushion.

Figure 3:
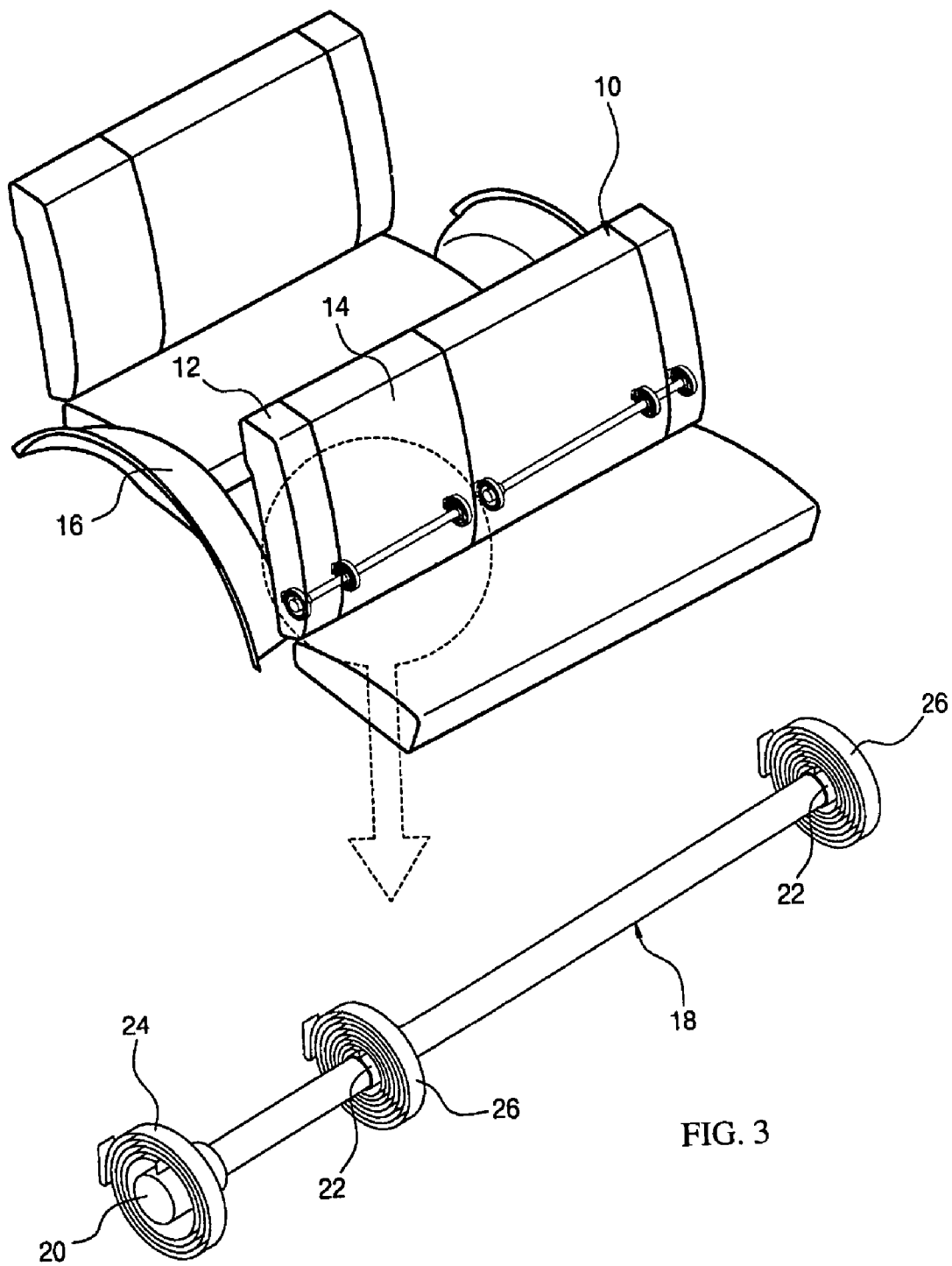
FIG. 3 is a perspective view showing seatbacks and a reclining shaft in a upright position of a seatback reclining apparatus according to an embodiment of the present invention.

Referring to FIGS. 2 and 3, the seatback 10 according to a preferred embodiment is divided into two independently operating seatbacks, a main seatback 14 and a subsidiary seatback 12, in order to prevent interference with a trim 16 of a wheel housing. The subsidiary seatback 12 is located where the trim 16 of the wheel housing is disposed. The main seatback 14 and the subsidiary seatback 12 are rotatably coupled to the reclining shaft 18.

The reclining shaft 18 is furnished with a first winding part 20 at one end thereof. A second winding part 22 is formed on the reclining shaft 18, apart from the first winding part 20 with a predetermined distance. The diameter of the first winding part 20 is bigger than that of the second winding part 22. Preferably, another second winding part 22 may be additionally installed to the other end of the reclining shaft 18. The distance between the first winding part 20 and the second winding part 22 is substantially the same as the width of the subsidiary seatback 12. The distance between each second winding part 22 is substantially the same as the width of the main seatback 14.

Around the first winding part 20 and the second winding part 22, a first spiral spring 24 and a second spiral spring 26 are wound, respectively, in which the number of winds in the second spiral spring 26 is greater than that in the first spiral spring 24. In other words, the overall length of the second spiral spring 26 is longer than that of the first spiral spring 24. The outer ends of the first spiral spring 24 and the second spiral spring 26 are coupled to the fixing pins 28 formed on the base plates 30 of the main seatback 14 and the subsidiary seatback 12 while biasing to rotate clockwise the fixing pin 28.

Figure 4:
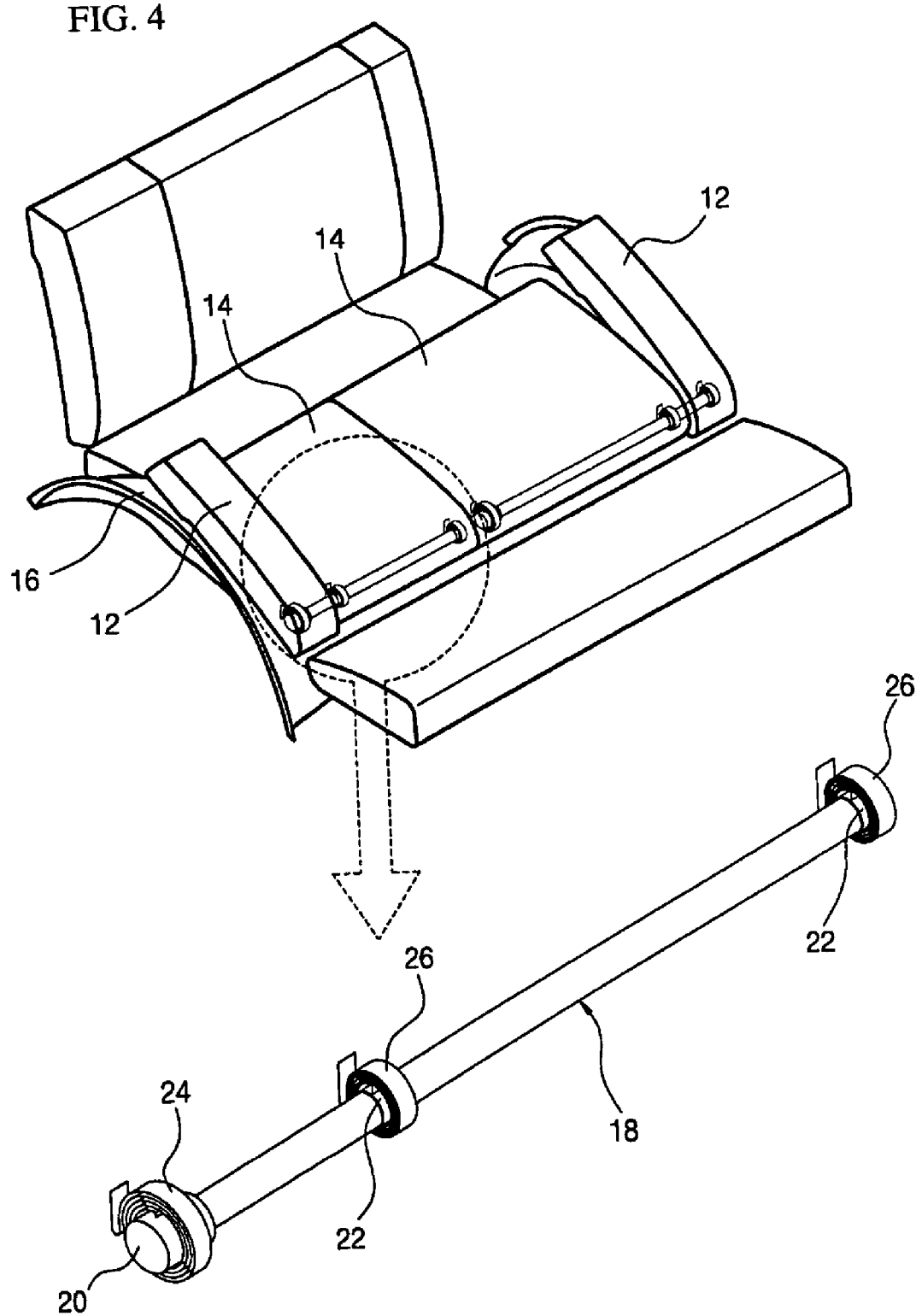
FIG. 4 is a perspective view showing seatbacks and a reclining shaft in a flat-folded position of a seatback reclining apparatus according to an embodiment of the present invention.

According to FIGS. 3 and 4, operation of a preferred embodiment of a seatback reclining apparatus is shown. Referring first to FIG. 3, when the reclining handle is pulled, releasing the seatback from lock, and an external force is applied to the seatbacks 10 consisting of the main seatback 14 and the subsidiary seatback 12, the seatbacks are folded together into a flat position substantially parallel to a seat cushion. As the seatbacks 10 are folded into a flat position, the base plates 30 of the seatbacks rotate about the reclining shaft 18 while winding the spiral springs 24 and 26 with respect to the reclining shaft 18.

As shown in FIG. 4, the subsidiary seatback 12 is not fully folded into a flat position because the length of the first spiral spring 24 wound around the first winding part 20 is relatively shorter than that of the second spiral spring 26. In other words, the first spiral spring 24 restrain the subsidiary seatback 12 from being fully flat-folded, whereby interference with the trim 16 of the wheel housing is effectively prevented. In the meantime, the second spiral spring 26 having a relatively long length, which is mounted on the second winding part 22, allows the main seatback 14 to be fully folded into a flat position substantially parallel to a seat cushion.

When a passenger intends to recline the seatbacks 10 by applying force to a certain part of the seatbacks 10, the subsidiary seatback 12 may not be reclined along with the main seatback 14 depending on the portion where the force is applied. This phenomenon can be cured by increasing frictional engagement between the subsidiary seatback 12 and the main seatback 14. The frictional engagement is created by tightly arranging the subsidiary seatback 12 and the main seatback 14 side by side. Alternatively, an engaging means may be provided at the frame of the main seatback 14, which enables a physical engagement between the subsidiary seatback 12 and the main seatback 14.

As the foregoing description, the seatback reclining apparatus according to the present invention, which is capable of independently reclining the main seatback actually supporting the back of a passenger and the subsidiary seatback interfering with the trim of a wheel housing, is advantageous in that it is troublesome to remove or remount a part of a seatback in a conventional seatback reclining apparatus can be eliminated. Moreover, the uncomfortable feeling at conventional seatback employing a hinge-type divided seatback also can be eliminated. Even though the present invention is described in detail with reference to the foregoing embodiments, it is not intended to limit the scope of the present invention thereto. It is evident from the foregoing that many variations and modifications may be made by a person having an ordinary skill in the present field without departing from the essential concept of the present invention.

What is claimed is:

1. A seatback reclining apparatus having a reclining means comprising:
    a seatback divided into a main seatback and a subsidiary seatback;
    a reclining shaft to which the main seatback and the subsidiary seatback are rotatably coupled at the lower end thereof;
    a first winding part integrally formed at one end of the reclining shaft;
    a second winding part integrally formed at the reclining shaft, apart from the first winding part with a predetermined distance, a diameter of the second winding part being smaller than a diameter of the first winding part;
    a first spiral spring wound around the first winding part; and
    a second spiral spring wound around the second winding part, wherein a number of winds in the second spiral spring is greater than a number of winds in the first spiral spring.

2. A seatback reclining apparatus according to claim 1, wherein ends of the first spiral spring and the second spiral spring are respectively coupled to fixing pins disposed on base plates of the subsidiary seatback and the main seatback.

3. A seatback reclining apparatus, comprising:
    a seatback divided into a main seatback and a subsidiary seatback;
    a reclining shaft rotatably coupled to a lower portion of the main seatback and the subsidiary seatback;
    a first winding part coupled with one end of the reclining shaft;
    a second winding part coupled with the reclining shaft, the second winding part being separated from the first winding part, wherein a diameter of the second winding part is smaller than a diameter of the first winding part;
    a first spring positioned around the first winding part; and
    a second spring positioned around the second winding part, wherein a number of winds of the second spring is greater than a number of winds of the first spring.

4. The seatback reclining apparatus of claim 3, wherein an end of the first spring is coupled with the subsidiary seatback and an end of the second spring is coupled with the main seatback.

5. A seatback reclining apparatus, comprising:

a seatback divided into a main seatback and a subsidiary seatback;

a reclining shaft rotatably coupled to a lower portion of the main seatback and the subsidiary seatback;

a first winding part coupled with one end of the reclining shaft;

a second winding part coupled with the reclining shaft, the second winding part being separated from the first winding part;

a first spring positioned around the first winding part; and a second spring positioned around the second winding part, wherein a number of winds of the second spring is greater than a number of winds of the first spring.

* * * * *